No. 696,674. Patented Apr. 1, 1902.
E. HARRISON & J. A. PLATTS.
CHECK HOOK.
(Application filed Apr. 22, 1901.)
(No Model.)
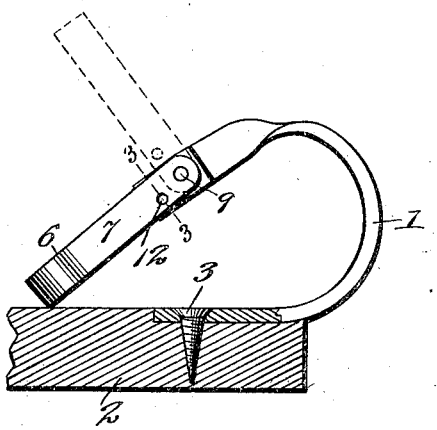
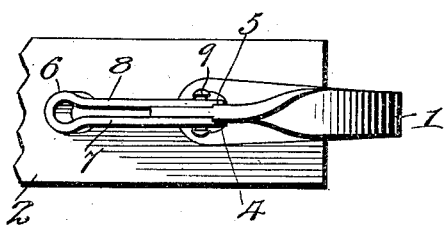
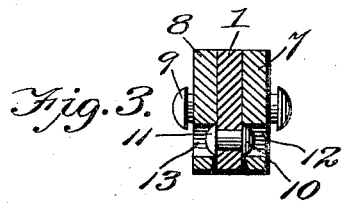
Witnesses
Edwin G. McKee
Geo. Ackman
Inventors
Edwin Harrison and
Joseph A. Platts
By Victor J. Evans.
Attorney

UNITED STATES PATENT OFFICE.

EDWIN HARRISON AND JOSEPH A. PLATTS, OF ELDRED, PENNSYLVANIA.

CHECK-HOOK.

SPECIFICATION forming part of Letters Patent No. 696,674, dated April 1, 1902.

Application filed April 22, 1901. Serial No. 56,888. (No model.)

*To all whom it may concern:*

Be it known that we, EDWIN HARRISON and JOSEPH A. PLATTS, citizens of the United States, residing at Eldred, in the county of McKean and State of Pennsylvania, have invented new and useful Improvements in Check-Hooks, of which the following is a specification.

This invention relates to check-hooks; and the primary object thereof is to provide a device of the character described which will effectually retain the checkrein in engagement with the saddle of the harness so that an excessive vibration of the rein due to the action of the head of the animal will not cause the rein to be displaced.

With this object in view the invention consists of the peculiar parts and combinations of parts, all of which will be described hereinafter, recited in the claim, and illustrated in the accompanying drawings, in which—

Figure 1 is a sectional view through the saddle of a harness, showing the check-hook in side elevation. Fig. 2 is a top plan view of the same. Fig. 3 is a transverse section on the line 3 3 of Fig. 1.

In carrying out our invention we provide a hook 1, approximately C-shaped, which may be secured to the saddle 2 in any well-known manner—as, for instance, as by a screw 3. The end of this hook is twisted, so that the side walls thereof are in a vertical plane, and the extremity thereof is reduced, so as to form shoulders 4 and 5. On this extremity is arranged a spring-loop 6 in the form of two parallel arms 7 and 8. The ends of these arms are reduced to conform to the shoulders 5 and 6 upon the hook 1 and are pivoted to the extension of said hook by a transverse pin 9. Adjacent the pivotal point of the loop and on either side of the extension of said hook are two bosses or lugs 10 and 11, adapted to rest within and interlock into openings 12 and 13 in the respective arms of the loop 6.

When the loop 6 is raised, as shown in dotted lines in Fig. 1, to receive the checkrein, the arms will be sprung apart, throwing the openings or recesses 12 and 13 out of engagement with the bosses 10 and 11, thereby permitting the loop to be readily thrown in a vertical plane. The springing apart of the arms is caused by the shoulders 4 and 5 on the hook 1, which acts as a cam when the arms of the loop ride upon the same. As soon as the checkrein has passed over the hook the loop will be forced down, as shown in Figs. 1 and 2, permitting the arms to spring slightly together, and thus throw the recesses 12 and 13 in locking contact with the bosses 10 and 11. It will therefore be impossible for this loop to be raised except manually, as the amount of pressure which would be exercised thereon due to the vibration of the checkrein would not be sufficient to raise the same. It will thus be seen that the probability of the checkrein becoming displaced is materially diminished, and while we have specifically described the details of construction of this device we reserve the right to make such slight changes in the form, size, and construction as would properly come within the scope of our invention without departing from the spirit thereof.

Having thus fully described our invention, what we claim as new, and desire to secure by Letters Patent, is—

The combination with a checkrein-hook having its upper end twisted to present the end in a vertical plane, and formed with opposite shoulders, of a loop comprising spring-arms reduced to conform to said shoulders embracing the vertically-disposed end of the hook and pivotally secured thereto, and formed adjacent to their pivotal point with openings; and bosses projecting from opposite sides of the upper end of the hook below the pivotal point of the loop over which the spring-arms snap to engage the bosses in the openings of the loop.

In testimony whereof we affix our signatures in presence of two witnesses.

EDWIN HARRISON.
JOSEPH A. PLATTS.

Witnesses:
B. G. MCFALL,
B. E. SIMMONS.